United States Patent [19]

Matsunaga et al.

[11] 4,071,462

[45] Jan. 31, 1978

[54] PROCESS FOR PREPARATION OF SODIUM PERCARBONATE OR SODIUM PERBORATE OF HIGH SPECIFIC VOLUME

[75] Inventors: Kinjiro Matsunaga, Funabashi; Yunosuke Nakagawa, Koshigaya; Haruhiko Arai, Narashino, all of Japan

[73] Assignee: Kao Soap Co., Ltd., Tokyo, Japan

[21] Appl. No.: 605,426

[22] Filed: Aug. 18, 1975

[30] Foreign Application Priority Data

Aug. 20, 1974 Japan .................. 49-95235

[51] Int. Cl.² .................. C11D 7/38; C11D 7/18
[52] U.S. Cl. .................. 252/99; 252/95; 423/277; 423/281; 423/415 P
[58] Field of Search .................. 252/94, 95, 99; 423/415 P, 281, 266

[56] References Cited

U.S. PATENT DOCUMENTS

| 1,321,643 | 11/1919 | King et al. | 252/95 |
|---|---|---|---|
| 2,254,434 | 9/1941 | Lind | 252/95 |
| 3,109,706 | 11/1963 | Leblon et al. | 423/281 |

FOREIGN PATENT DOCUMENTS 1,191,571  5/1970  United Kingdom ............ 423/415 P Primary Examiner—Mayer Weinblatt
Attorney, Agent, or Firm—Blanchard, Flynn, Thiel, Boutell & Tanis

[57] ABSTRACT

Sodium percarbonate or sodium perborate of high specific volume is prepared by mixing sodium carbonate or sodium borate, or an aqueous solution thereof, with aqueous hydrogen peroxide, in the presence of an anionic surface active agent in an amount exceeding the critical concentration for micelle formation.

9 Claims, No Drawings

PROCESS FOR PREPARATION OF SODIUM PERCARBONATE OR SODIUM PERBORATE OF HIGH SPECIFIC VOLUME

BACKGROUND OF THE INVENTION

1. Field of the Invention

This invention relates to a process for the preparation of sodium percarbonate or sodium perborate having a good flowability and a high specific volume.

2. Description of the Prior Art

Sodium perborate ($NaBO_2.H_2O_2.3H_2O$) has an excellent stability and it has been used for a long time as a powdery bleaching agent in Europe and America. However, because the bleaching effect of this compound is insufficient at lower temperatures, in Japan, where washing is conducted by using cold water, sodium perborate is not very suitable as a bleaching agent and it is scarcely used. Sodium percarbonate ($Na_2CO_3.3/2\ H_2O_2$) has a higher water solubility than sodium perborate and it has the advantage that it readily dissolves in cold water. Accordingly, this bleaching agent is widely used in Japan.

A conventional bleaching detergent composition comprises a powdery detergent having incorporated therein from 10 to 20 wt.% of sodium percarbonate or sodium perborate. However, when such a bleaching agent is incorporated in a detergent, because of the differences of the specific volumes, the shapes and the particle sizes of the two components, due to the shaking and vibration that occurs during transportation, the sodium percarbonate or sodium perborate becomes concentrated in the central portion of the package. Namely, a classification phenomenon occurs. Because of this classification phenomenon, the distribution of the bleaching agent in the detergent composition becomes non-uniform and attainment of a uniform bleaching effect of the bleaching agent cannot be expected. Further, these peroxides are defective in that they are inferior in flowability in the powder state and caking readily occurs during storage.

Various methods have heretofore been proposed as means for minimizing or overcoming these difficulties or disadvantages. For example, there can be mentioned a method comprising mixing a peroxide, such as sodium percarbonate, with water and granulating and drying the mixture; a method comprising agitating and fluidizing a peroxide in an inert organic solvent such as carbon tetrachloride and drying the thus-treated peroxide; a method comprising using sodium chloride as a nucleus during precipitation of the peroxide; and a method comprising adding water to a molten peroxide, agitating the mixture, incorporating a powder of the same peroxide into the agitated mixture, and cooling the mixture under agitation. According to these known methods, however, it is impossible to obtain a powdery bleaching agent having an excellent flowability and a high specific volume.

SUMMARY OF THE INVENTION

We have discovered a process for preparing sodium percarbonate or sodium perborate of high specific volume, which overcomes the foregoing defects and shortcomings involved in the conventional techniques. Our invention provides high specific volume sodium percarbonate or sodium perborate having a free flowability, which substances can be incorporated stably in a powdery detergent composition without causing any reduction of the active oxygen concentration-retaining property of sodium percarbonate or sodium perborate, and while preventing classification of the peroxide in the powdery detergent composition. More specifically, in accordance with this invention, there is provided a process for preparing high specific volume sodium percarbonate or sodium perborate comprising mixing sodium carbonate or sodium borate, or an aqueous solution of either thereof, with aqueous hydrogen peroxide, in the presence of an anionic surface active agent which is present in an amount exceeding the critical concentration of said agent for micelle formation, whereby to precipitate sodium percarbonate or sodium perborate of high specific volume.

In this invention, it is critical to employ an anionic surface active agent, present in an amount exceeding its critical concentration for micelle formation. Other types of surface active agents such as nonionic, cationic and amphoteric surface active agents are ineffective to produce a product having a high specific volume. It is also critical that the amount of the anionic surface active agent should exceed its critical concentration for micelle formation. If the amount of the anionic surface active agent is less than the critical concentration for micelle formation, a product having a sufficiently high specific volume cannot be obtained. The above mentioned critical concentration for micelle formation was explained in M. L. Corrin and William D. Harkins, Journal of American Chemical Society, vol. 69 (1947), page 683.

As the anionic surface active agent that can be used in this invention, there can be mentioned, for example, soaps, higher alcohol sulfates, alkylsulfonates, alkyldisulfonates, sulfated fatty acid salts, polyoxyethylene alkyl ether sulfates, salts of alkylolated sulfates of higher fatty acid amides, alkylated sulfonates of higher fatty acid amides, alkylbenzene sulfonates, alkylphenol sulfonates, alkylnaphthalene sulfonates, alkyldiphenyl sulfonates, and the like.

The purpose of this invention can be attained, provided that the concentration of the anionic surface active agent is higher than its critical concentration for micelle formation. However, too high a concentration of the anionic surfactant is not preferred in view of the solubility. In general, the surface active agent is used at a concentration lower than 5% by weight, based on the weight of the entire reaction mixture.

The anionic surfactants include water-soluble soaps, e.g. the sodium, potassium, ammonium and alkylol ammonium salts, of higher fatty acids or resin salts containing about 8 to 20 carbon atoms, preferably 10 to 18 carbon atoms, such as sodium and potassium salts of fatty acid mixtures derived from coconut oil and tallow. The anionic surfactants also include water-soluble sulfated and sulfonated synthetic detergents having an alkyl radical of 8 to 26 carbon atoms, preferably about 12 to 22 carbon atoms, and a radical selected from the group consisting of sulfonic acid and sulfuric acid ester radicals in their molecular structure. The term alkyl includes the alkyl portion of higher acyl radicals. Examples of sulfonated anionic surfactants include alkyl aromatic sulfonates such as alkyl benzene sulfonates, alkyl phenol sulfonates and alkyl naphthalene sulfonates in which the alkyl group has from 8 to 18 carbon atoms; olefin sulfonates, hydroxyalkane sulfonates and mixtures thereof obtained from olefins having 8 to 25, preferably 12 to 20, carbon atoms; alkyl sulfonates and disulfonates in which the alkyl group has from 10 to 20 carbon atoms; and salts of higher fatty acids having 8 to 20 carbon atoms esterified with isethionic acid. Examples of sulfated anionic surfactants include sulfates of higher alcohols having 8 to 18 carbon atoms such as sodium lauryl sulfate and sodium tallow alcohol sulfate; sulfates of mono- or di-glycerides of higher ($C_{10}$ - $C_{18}$) fatty acids; polyoxyethylene alkyl ether sulfates containing 1 to 6 moles of ethylene oxide and in which the alkyl contains from 8 to 18 carbon atoms; polyoxyethylene alkylphenol ether sulfates containing 1 to 10 moles of ethylene oxide and in which the alkyl contains 8 to 12 carbon atoms; and sulfates of alkanolamides of higher fatty acids having 12 to 18 carbon atoms, such as the sodium salt of the half sulfate ester of lauric ethanolamide.

The anionic surface active agent can be added to either an aqueous solution of sodium carbonate or sodium borate, or to the aqueous hydrogen peroxide. Further, the order of mixing or addition is optional in this invention. More specifically, high specific volume sodium percarbonate or sodium perborate can be obtained in similar fashion (1) by adding the surface active agent to an aqueous solution of sodium carbonate or sodium borate and either (a) adding the resulting solution to aqueous hydrogen peroxide, or (b) adding aqueous hydrogen peroxide to the above-mentioned solution, or (2) by adding the surface active agent to aqueous hydrogen peroxide and either (a) adding the resulting solution to an aqueous solution of sodium carbonate or sodium borate, or (b) by adding an aqueous solution of sodium carbonate or sodium borate to the above-mentioned hydrogen peroxide solution. In this invention, 15 to 70 percent by weight aqueous solution of sodium carbonate and 10 to 100 percent by weight aqueous hydrogen peroxide are used. Alternatively, 1 to 70 percent by weight aqueous solution of sodium borate and 5 to 100 percent by weight aqueous hydrogen peroxide are used. When sodium carbonate or sodium borate is not entirely dissolved, the slurry liquid may be used. Furthermore, according to this invention, solid sodium carbonate or sodium borate itself can be added to aqueous hydrogen peroxide containing a surface active agent.

The reaction temperature is not critical, provided that the solutions remain in the liquid phase. A reaction temperature in the range of 0° to 80° C is acceptable and ambient temperature (5° to 25° C) is preferred.

Sodium percarbonate or sodium perborate is precipitated in the crystalline form only if an aqueous solution of sodium carbonate or sodium borate is mixed with aqueous hydrogen peroxide. A product having a high specific volume can be obtained only by making an anionic surface active agent present during this precipitation. The use of sodium percarbonate is especially preferred in this invention. In the case of other peroxides, such as a phosphate-hydrogen peroxide adduct, even when an aqueous solution of a phosphate is mixed with aqueous hydrogen peroxide, no crystals are formed; rather, crystals are obtained by concentrating the resulting liquid mixture. In this case, even if an anionic surface active agent is made present in the system, no peroxide of high specific volume is obtained.

Sodium percarbonate or sodium perborate prepared according to the above-mentioned process of this invention has a specific volume from 2.0 to 3.0 times as high as that of sodium percarbonate or sodium borate prepared according to the conventional techniques (that is, the density of the product of this invention is ½ to ⅓ of the density of the conventional product). According to this invention, sodium percarbonate or sodium perborate has a specific volume of 5 to 10 cc/g. Another advantage is that when sodium percarbonate or sodium perborate prepared according to the process of this invention is separated from the mother liquid and is dried, it does not take a massive agglomerated form, and even if it accidentally becomes agglomerated, the agglomerates are very brittle and can easily be pulverized and powdered. Still further, even if the product of this invention is stored for a long time, caking does not appreciably occur and it retains an excellent flowability.

Moreover, since sodium percarbonate and sodium perborate, prepared according to the process of this invention, is in a very finely divided state, when it is blended into a powdery detergent, it is preferred to employ a granulated sodium percarbonate or sodium perborate product formed by extrusion granulation or the like. Because the thus-formed granulated product has a higher specific volume than sodium percarbonate or sodium perborate prepared according to conventional methods, it can be stably incorporated in a powdery detergent without causing separation or classification. Further, when sodium percarbonate or sodium perborate prepared according to this invention is blended in a powdery detergent, it has a stability superior to, or at least comparable to, the stability of the product prepared by conventional methods. In the above mentioned granulation process, the sodium percarbonate or sodium perborate powder of this invention is mixed with 5 to 20 percent by weight, based on the powder, of water and up to 10 percent by weight of a binder such as carboxymethyl cellulose and conventional ones and the mixture is subjected to granulation to obtain the granule having the particle size of 0.5 to 5 mm.

This invention will now be further described in detail by reference to the following illustrative Examples, in which all references to "%" are by weight.

EXAMPLE 1

318 g of sodium carbonate was dissolved in 750 ml of an aqueous solution of a surface active agent as indicated in Table 1, and 460 g of 30% aqueous hydrogen peroxide was added to the solution and the mixture was agitated. The solution was cooled, and the precipitated crystals were recovered by filtration and heated and dried under vacuum. The specific volumes of the thus-obtained powdery sodium percarbonate and agglomerates thereof prepared by extrusion granulation, as well as the storage stability of the granulated product blended in a powdery detergent, were measured.

GRANULATION METHOD

The sodium percarbonate powder was mixed with about 10% by weight, based on the powder, of an aqueous solution containing 3% of carboxymethyl cellulose and the mixture was granulated through a screen having a mesh size of 1 mm by using an extrusion granulated (Eck Pelletor Model D-60 manufactured by Fuji Powder Co.). The granulated product was dried at 60° C for 1 hour.

STORAGE STABILITY TEST 10 parts by weight of the granulated sodium percarbonate was blended into 90 parts by weight of a commercially available powdery detergent (manufactured and sold under the tradename "New Beads" by Kao Soap Co., having a specific volume of about 4.0). 500 g of the mixture was packed in a paper carton and was stored under an atmosphere of a saturated aqueous solution of ammonium chloride (at a temperature of 30° C and a relative humidity of 80%). After the passage of 20 days, the available oxygen concentration was measured to determine the residual ratio thereof, i.e. the amount of available oxygen at the end of the test/amount of available oxygen at the start of the test (× 100).

The results are shown in Table 1.

TABLE 1

| Run No. | Surface Active Agent | Concentration (%) | Specific Volume (cc/g) powdery product | Specific Volume (cc/g) granulated product | Stability (effective oxygen residual ratio, %) |
|---|---|---|---|---|---|
| 1 | not added | 0 | 2.9 | 1.6 | 47 |
| 2 | sodium dodecylsulfate | 0.1 | 8.8 | 4.6 | 55 |
| 3 | sodium dodecylbenzene-sulfonate | 0.1 | 7.2 | 3.8 | 54 |
| 4 | sodium oleate | 0.1 | 7.4 | 3.9 | 49 |
| 5 | sodium dodecylsulfate** | 0.001 | 3.0 | 1.7 | 50 |
| 6 | polyoxyethylene (P=9) lauryl ether | 0.1 | 3.1 | 1.7 | 54 |
| 7 | alkyldimethylbenzyl ammonium chloride* | 0.5 | 3.0 | 1.6 | 46 |
| 8 | alkyldimethyl betaine* | 0.1 | 4.4 | 2.1 | 55 |

*Mixture of compounds differing in the number of the alkyl group in a range of from 12 to 14.
**The value of the critical concentration for micelle formation of sodium dodecylsulfate in the aqueous solution of sodium carbonate used in this Example was about 0.007% as calculated according to the Carrin-Harkins calculation formula.

As is seen from the above results, sodium percarbonate prepared according to the process of this invention (Runs Nos. 2 to 4) has a specific volume about 2.5 to about 3 times higher than the specific volume of the product prepared according to the conventional method. But when a non-ionic, cationic or amphoteric surface active agent is employed (Runs Nos. 6 to 8), a product having such a high specific volume cannot be obtained. It is also seen that even when an anionic surface active agent is employed, if its concentration is lower than its critical concentration for micelle formation (Run No. 5), a product having a high specific volume cannot be obtained.

The granulated products obtained in Runs Nos. 1 and 2 were mixed with the powdery detergent, the mixtures were packed into paper cartons, the packed cartons were loaded on a car and they were subjected to a transportation test. Extreme classification was observed in the case of the product of Run No. 1 but no appreciable classification occurred in the case of the product of Run No. 2.

EXAMPLE 2

An inorganic salt as listed in Table 2 was dissolved in 750 ml of an aqueous solution containing 0.1% of sodium dodecylsulfate as the surface active agent, and 30% aqueous hydrogen peroxide was added to the solution and the mixture was agitated. Thus, various inorganic peroxides were prepared in the same manner as described in Example 1, and the specific volume and storage stability of these products were examined by the same test as described in Example 1. The results shown in Table 2 were obtained.

Table 2

| Run No. | Inorganic Salt | Surface Active Agent | Amount (g) of Inorganic Salt | Amount (g) of $H_2O_2$ | Specific Volume (cc/g) Powdery product | Specific Volume (cc/g) graulated product | Available Oxygen Residual Ratio (%) |
|---|---|---|---|---|---|---|---|
| 1 | sodium carbonate | not added | 318 | 460 | 2.9 | 1.6 | 47 |
|   | " | added | 318 | 460 | 8.8 | 4.6 | 55 |
| 2 | sodium borate | not added | 177 | 180 | 3.9 | 2.0 | about 100 |
|   | " | added | 177 | 180 | 5.3 | 2.7 | about 100 |
| 3 | sodium pyrophosphate | not added | 420 | 210 | 3.5 | 1.8 | about 0 |
|   | " | added | 420 | 210 | 3.6 | 1.8 | about 0 |
| 4 | sodium tri-polyphosphate | not added | 400 | 100 | — | — | — |
|   | " | added | 400 | 100 | — | — | — |

According to the process of this invention (Runs Nos. 1 and 2, containing "added" surface active agent), a peroxide powder having a high specific volume and a good flowability was obtained, but in Run No. 3, since the peroxide was not precipitated as crystals, even though drying on a water bath of 100° C and pulverization were conducted, a product having a high specific volume could not be obtained. In Run No. 4, even though drying on a water bath was tried, the drying could not be conducted sufficiently, and the product was too powdered and the specific volume could not be measured.

The embodiments of the invention in which an exclusive property or privilege is claimed are defined as follows:

1. A process for preparing sodium percarbonate having a specific volume of from 5 to 10 cc/g, which consists essentially of the steps of: mixing (1) sodium carbonate or an aqueous solution of sodium carbonate, with (2) an aqueous solution of hydrogen peroxide, wherein at least one of said solutions has dissolved therein a water-soluble anionic organic surfactant selected from the group consisting of the sodium, potassium, ammonium and alkylol ammonium salts of higher fatty acids or resin salts containing about 8 to 20 carbon atoms; alkyl benzene sulfonates, alkyl phenol sulfonates and alkyl naphthalene sulfonates in which the alkyl group has from 8 to 18 carbon atoms; olefin sulfonates, hydroxyalkane sulfonates and mixtures thereof obtained from olefins having 8 to 25 carbon atoms; alkyl sulfonates and disulfonates in which the alkyl group has from 10 to 20 carbon atoms; salts of higher fatty acids having 8 to 20 carbon atoms esterified with isethionic acid; sulfates of higher alcohols having 8 to 18 carbon atoms; sulfates of mono- or di-glycerides of higher ($C_{10} - C_{18}$) fatty acids; polyoxyethylene alkyl ether sulfates containing 1 to 6 moles of ethylene oxide and in which the alkyl contains from 8 to 18 carbon atoms; polyoxyethylene alkylphenol ether sulfates containing 1 to 10 moles of ethylene oxide and in which the alkyl contains 8 to 12 carbon atoms; and sulfates of alkanolamides of higher fatty acids having 12 to 18 carbon atoms, wherein the concentration of said surfactant in the mixture of (1) and (2) is higher than the critical concentration for micelle formation of said surfactant and is less than about 5 percent by weight, based on the weight of said mixture, whereby to precipitate crystals of sodium percarbonate; and recovering said crystals of sodium percarbonate from said mixture.

2. A process as claimed in claim 1 in which the reaction temperature is from zero to 80° C.

3. A process as claimed in claim 1 in which the reaction temperature is from 5° to 25° C.

4. A process as claimed in claim 1 in which said surfactant is sodium dodecyl sulfate.

5. Sodium percarbonate obtained by the process of claim 1.

6. A process as claimed in claim 1 in which (1) is an aqueous solution of sodium carbonate.

7. A process as claimed in claim 6 in which (1) contains from 15 to 70 percent by weight of sodium carbonate, and (2) contains from 10 to 100 percent by weight of hydrogen peroxide.

8. A process as claimed in claim 1, including the step of mixing said crystals with an aqueous solution of carboxymethyl cellulose binding agent effective to bind together said crystals and then forming agglomerates of said crystals by extrusion granulation.

9. Sodium percarbonate obtained by the process of claim 8.

* * * * *